United States Patent [19]

Loew

[11] 3,716,502

[45] Feb. 13, 1973

[54] ELASTOMERIC THERMOPLASTIC POLYESTER POLYURETHANE COMPOSITIONS STABILIZED AGAINST HYDROLYSIS

[75] Inventor: Frederic Christian Loew, Ridgewood, N.J.

[73] Assignee: Inmont Corporation, New York, N.Y.

[22] Filed: Nov. 27, 1970

[21] Appl. No.: 93,409

[52] U.S. Cl....260/2.5 AY, 260/2.5 BB, 260/2.5 AK, 260/32.6 N, 260/37 N, 260/45.8 N, 260/45.9 R, 260/77.5 SS, 264/49

[51] Int. Cl.....C08g 51/56, C08g 51/60, C08g 53/08

[58] Field of Search.....260/77.5 SS, 2.5 AY, 2.5 AK, 260/2.5 BB, 37 N, 45.9 R, 32.6 N, 45.8 N; 264/49

[56] References Cited

UNITED STATES PATENTS

| | | | |
|---|---|---|---|
| 3,496,001 | 2/1970 | Minobe | 260/2.5 AY |
| 3,510,344 | 5/1970 | Dunderdale | 260/2.5 AY |
| 3,595,732 | 7/1971 | Tingerthal | 260/2.5 AY |
| 3,642,966 | 2/1972 | Morrissey | 260/2.5 AY |
| 3,622,526 | 11/1971 | Zorn | 260/2.5 AK |
| 3,607,822 | 9/1971 | Nishino | 260/37 N |
| 3,460,969 | 8/1969 | Murphy | 117/161 KP |
| 2,740,743 | 4/1956 | Pace | 260/2.5 AK |
| 3,450,669 | 6/1969 | Nolen | 260/2.5 BB |
| 3,378,517 | 4/1968 | Knipp | 260/37 N |
| 3,296,190 | 1/1967 | Reischl | 260/45.7 R |
| 3,193,525 | 7/1965 | Kallert | 260/2.5 BB |
| 3,193,522 | 7/1965 | Neumann | 260/2.5 BB |

FOREIGN PATENTS OR APPLICATIONS

| | | | |
|---|---|---|---|
| 6,716,891 | 6/1968 | Netherlands | 260/2.5 AY |
| 1,031,799 | 6/1966 | Great Britain | 260/2.5 AK |

OTHER PUBLICATIONS

The Colloid Chemistry of Silica and Silicates; R. K. Iler, Cornell U. Press, N.Y. 1965, pp. 172 and 173.
The Science of Surface Coatings; Chatfield, Ernest Bean Ltd., London, 1962, pp. 204–205.

*Primary Examiner*—Donald E. Czaja
*Assistant Examiner*—C. Warren Ivy
*Attorney*—Abner Sheffer and F. W. Wyman

[57] ABSTRACT

Addition of small amounts of acidic silica to improve hydrolytic stability of polyurethanes.

17 Claims, No Drawings

ELASTOMERIC THERMOPLASTIC POLYESTER POLYURETHANE COMPOSITIONS STABILIZED AGAINST HYDROLYSIS

The present invention relates to polyurethane materials, especially microporous polyurethane materials having an enhanced resistance to hydrolytic degradation.

The problem of hydrolytic stability of polyurethanes and especially of polyesterurethane elastomers has long been known in the art. One discussion of this problem is found in Stewart U.S. Pat. No. 3,463,758 of Aug. 26, 1969, which states that the presence of free carboxylic acid in the polymer leads to autocatalytic hydrolysis and that, to avoid this, one should make the polyurethane from a polyester having an acid number of 0.1 or less. Such polyesters of extremely low acid number are generally considerably more difficult to prepare and more expensive than the ordinary commercial polyesters that are more usually employed for polyurethane manufacture.

According to one aspect of the present invention it is found that the hydrolytic stability of polyurethane and particularly of polyurethane sheet material (in flat or shaped form) can be improved by incorporating a small amount of finely divided silica therein. The amount used is less than 10 percent, for example in the range up to 8 or 9 percent, but in excess of 0.1 percent for example in excess of 0.5 percent especially 1 percent or above, e.g., 2 percent to 6 or 8 percent. The silica preferably has a pH of less than 6, e.g., in the range of about 2 to 5.

The use of the acidic silica is particularly advantageous in connection with microporous thick polyurethane sheets which do not have their extensibility constrained by fibrous reinforcement and are useful as upper materials for shoes. These materials have thickness in excess of 0.6 mm and elongations at break of 100 percent or more, e.g., at least 150 percent especially 250 to 450 percent. The hydrolytic stability imparted by the acidic silica is of importance in the use of the shoes, in which the uppers are subjected to hydrolytic influences (e.g., water, perspiration, etc.) as well as in the process of preparing the sheet material in which the polymer is subjected to aqueous coagulating and extracting solutions, often at elevated temperatures.

The disclosure of U.S. application Ser. No. 819337 filed Apr. 25, 1969, now abandoned, is incorporated herein by reference and attention is particularly directed to its disclosure as to the utility of the product, the nature of the polyurethane, and the nature, treatment and use of the microporous product.

The invention may be put into practice in various ways and certain examples will be described to illustrate it. In this application all proportions are by weight unless otherwise indicated.

EXAMPLE 1

Eight hundred and eighty kgs of pure N,N-dimethylformamide were placed in a 1,500 Kg reactor flushed with dry nitrogen. 0.027 Kgs of paratoluene sulphonic acid and 0.020 Kgs of dibutyltin dilaurate were dissolved in the dimethylformamide. 205.0 Kgs of Desmophen 2001 polyester (a hydroxyl-terminated polyester of 2,000 molecular weight, having a hydroxyl number of about 55.5 mg KOH per g made from about 1 mol butanediol-1,4, 1.13 mol ethylene glycol and 2 mols adipic acid), and 48 Kgs of butane diol -1,4 were than added and dissolved in the mixture and the temperature of the mixture adjusted to 25°C.

171.6 Kgs of 4,4-diphenylmethanediisocyanate were then added bit by bit care being taken to keep the temperature from rising above 50°C. Once the addition was complete the mixture was heated to 60°C and maintained at that temperature for 1½ hours with stirring. The excess unreacted isocyanate content was then determined by titration of an aliquot. Sufficient butane diol (3.0 Kgs) was then added to react essentially stoichiometrically with the unreacted isocyanate. The mixture was then maintained at 60°C with stirring and the viscosity measured periodically until it had risen to a value of 3500 poise (Brookfield 5 or 6 spindle) as corrected to 24°C. 4.10 Kgs of butane diol 1,4 were then added as capping agent to terminate the reaction dissolved in 3.5 Kgs of N,N-dimethylformamide. The resultant solution had a polyurethane solids content of 32.5 percent.

A solution of polyurethane in N,N'-dimethyl formamide made as described above and having a polymer solids concentration of 32.5 percent and containing one-half percent based on polymer of N,-(trichloromethylthio) phthalimide (Fungitrol 11), a fungicide, one-half percent based on polymer of tetrakis [methylene 3-(3',5'5',diterti-arybutyl-4'-hydroxy phenyl propionate] methane, an antioxidant for the polyurethane, and 3 percent based on polymer of STABAXOL a carbodimide stabilizer, against hydrolysis of the polyurethane was used.

This solution was mixed into micropulverized sodium chloride (average particle size in the range 10 to 15 microns as determined by sedimentation techniques) to give a salt to polymer weight ratio of 1.6 to 1. Varying amounts of microscopic silica powder were also added to the mixture at this stage. The mixture was thoroughly mixed and degassed under vacuum and then knife coated onto a porous temporary support (a sintered high density polyethylene sheet having the properties described in Example 1 of French Patent 1584466, the disclosure of which is incorporated herein by reference.) The layer on the support was then immersed in water at 30°C for 1 hour to coagulate the polyurethane. The material was then stripped from the support and immersed in stationary water at 60°C for 3 hours to remove substantially all the remainder of the dimethylformamide and substantially all the salt (e.g., to a concentration at least as low as 1,000 milligrams of salt per m²). The material was then dried at 100°C for 1 hour.

The silica used was of very fine particle size. A number of materials were used as follows:

a. The material sold as Aerosil R.972 is stated to have an average particle size of 20 millimicrons and is described as a micronized silica made hydrophobic by silicones. It is believed that the silicones are absorbed or coated onto the surface of the silica particles. The material is described as a hydrophobic highly dispersed silica acid powder. 1 gram of the material is stated to contain $3 \times 10^{17}$ primary particles and thus has a very large surface area believed to be in excess of 200 square meters per gram and as much as 400 square meters per gram. A 4 percent by weight dispersion in a 1 to 1 methanol water blend exhibits a pH of 3.6 to 4.0.

The preparation and properties of the Aerosil R972 are given in detail in the article by Brunner and Schutte in "Chem-iker-Zeitung/Chemische Apparatur" 89 (1965) 437-440, which states that this material is made by reacting silica (having silanol groups) with dimethyl dichlorosilane and steam in a fluidized bed reactor (Fr. pat. 1,368,765;DAS 1,163,784). The article also states that the surface area of the resulting hydrophobic silica particles is determined by the Brunauer, Emmet and Teller nitrogen adsorption method, the specific area is found to be 120 ± 30m$^2$/g; it also states that the chlorine content is 0.04 ± 0.01 percent, which indicates that at least part of the acidity of the silica may be due to small amounts of residual HCl dispersed on the surfaces of the silica particles.

b, c, and d. A material sold as Santocel 54 and materials sold as Aerosil A 200 and Aerosil A 300 were also used. These materials are all fumed silicas made, for example by the high temperature hydrolysis of a silicon halide such as silicon tetrachloride. See, for instance, the article on "Silica ;(amorphous)" in the Encyclopedia of Chemical Technology Volume 18 (second edition, 1969) page 67; the article on "Aerosil ..." by Wagner and Brunner in Angew. Chem. 72 (1960) pages 744–750; and the article on "Pyrogenic Oxides of silicon and aluminum" in the book "Ultrafine Particles" (ed. Kuhn, Lamprey, Scheer) published 1963 by John Wiley pages 196–205. The pH of an Aerosil in 4 percent aqueous dispersion is typically about 3.8 (see page 747 of the Watner and Brunner article) and it has less than 0.025% HCl, measured by argentometric titration.

e. Another suitable acidic silica is the material known as "Gasil 644," which is a micronized silica gel which has been impregnated with magnesium silicofluoride and which has a particle size of about 3 to 5 microns and a pH (measured in 4 percent aqueous suspension) of about 2.2. It is believed that this material is prepared by the process described in German patent 957,755 of Feb. 7, 1957. The use of this particular silica, which yields particularly outstanding results, is the discovery of David Price.

Each of these materials was used at concentrations of 0, 1, 3, 5, and 10 percent by weight based on the polymer.

All were observed to enhance the resistance of the microporous product to hydrolytic degradation as tested by an accelerated treatment involving boiling in water in a pressure cooker and then determining tensile strength as compared with a sample which had not been boiled. However, this effect was observed to be marked at the 3 and 5 percent values but the 10 percent values were not significantly better than the material with no silica. A lesser but noticeable improvement at the 1 percent value was observed with Aerosil R.972. It is thus anticipated that values in the range about 1 percent say 2 percent upwards and well below 10 percent, will be most useful. A useful increase in initial modulus was also observed but no significant adverse effects on the other properties of the microporous sheet were observed.

EXAMPLE 2

The Examples of British Patent Specification No. 28076/69 (now U.S. application Ser. No. 42,793 filed June 2, 1970) were repeated using the concentrations of silica quoted in Example 1 above. The silica was added only to the substrate formulation and the carbon black pigment master batch was omitted from the substate formulations. The top coat formulation was unchanged. The substrate resin concentration, salt ratio, and additive content was the same as for Example 1 above.

Similar enhancements of resistance to hydrolytic degradation were observed.

The disclosures of British Patent Specification No. 28076/69 and said corresponding U.S. application Ser. No. 42,793 are incorporated herein by reference.

The acidic silicas in the concentrations described above have also been observed to markedly enhance the resistance to hydrolytic degradation of solid cast films of these polyurethanes made, for instance, as described in the just-mentioned applications or in the previously mentioned application Ser. No. 819,337.

EXAMPLE 3

A. A solution of elastomeric polyurethane (of I.V. about 1.1) in dimethylformamide is made in a manner similar to that described in detail in Example 1 above, and mixed with 0, 1, 2 and 3 percent (based on the weight of polyurethane) of Aerosil R-972. Each mixture is cast into the form of a film, from which the solvent is evaporated. The I.V. of each film is then measured; the film is exposed to an atmosphere of 100 percent relative humidity at 100°C for 10 hours; the I.V. is measured again;and the ratio of final I.V. to original I.V. for each film is calculated. The resulting ratios are as follows: 0% silica, 0.513; 1% silica, 0.683; 2% silica, 0.775; 3% silica, 0.763.

B. Example 3A is repeated, except that the additives and results are as tabulated below:

| Additive | I.V. ratio |
| --- | --- |
| none | 0.537 |
| 1.5% PCD | 0.500 |
| 1.5% PCD, 1% Aerosil R-972 | 0.824 |
| 1.5% PCD, 1% Santocel 54 | 0.767 |

The "PCD" used in this example is the same as the Stabaxol used in Example 1. It is triisopropylbenzene polycarbodiimide (see British patent 986,200 Example 1) having the general formula

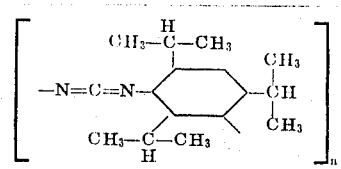

It is supplied commercially as "Stabaxol PCD" (which contains 2 percent admixed organic material to prevent lump formation) as fine light brown granules of specific gravity 1.05, and begin to sinter rapidly above about 50°C, is of resin-like viscosity above 70°C and flows slowly above about 90°C. It is very easily soluble in petrol, benzene, carbon tetrachloride and ethyl acetate and practically insoluble in ethyl alcohol and water.

The proportion of polycarbodiimide used in the mixture is generally within the range of about 0.5–5 percent, based on the weight of polyurethane.

It is also within the broader scope of the invention to use other carbodiimides in place of all or part of the PCD. Examples of such carbodiimides which are known stabilizers against hydrolysis are found in British patent 986,200, whose disclosure of carbodiimides is incorporated herein by reference; that patent describes particularly the use of polycarbodiimides having a molecular weight of at least 500 and having more than three carbodiimide groups, such as polycarbodiimides in which the monomeric unit is a carbodiimide group attached to a divalent hydrocarbon group.

A particularly suitable composition contains the silica together with polycarbodiimide and a trichloromethylthio imide as disclosed in my copending application titled "Stabilizing," Ser. No. 93,410 filed Nov. 21, 1970, whose entire disclosure is incorporated herein by reference.

The invention has found its greatest utility in the stabilization of very high molecular weight thermoplastic elastomeric polyurethanes having intrinsic viscosities above 0.8 and preferably 1.0 to 1.4, e.g., 1.1 to 1.2. The polyurethane is preferably produced by the reaction of a hydroxyl-terminated prepolymer with a diisocyanate and a diol. It is also within the scope of the invention to use a diamine, as a chain extender, in place of the diol, in a manner well known to the art.

The hydroxyl-terminated prepolymer preferably has a molecular weight below 6,000 and preferably above 500, more preferably between 800 and 2,500; a molecular weight of 1,800–2,200 is particularly preferred. It may be a polyester of a hydroxy-carboxylic acid (e.g., a polycaprolactone) or a polyester of a glycol and a dicarboxylic acid (e.g., ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about three to six carbon atoms in length. A prepolymer which provides flexible or "soft" segments in the polyurethane molecule is preferred. The acid number of the polyester is generally below about 3 and preferably less than 2, e.g., 0.2 to 1.5.

The hydroxyl-terminated prepolymer may be a polyether. Typical polyethers which are used to provide the soft segments for elastomeric polyurethanes are usually of aliphatic character. One type has the formula $H(RO)_n$ where R is a divalent alkylene radical, such as tetramethylene or ethylene or propylene, and $n$ denotes the degree of polymerization.

The preferred diisocyanate is diphenyl methane - p,p'-diisocyanate, but other diisocyanates may be used as such or in admixture therewith. Examples of other diisocyanates are 2,4-toluene diisocyanate, p,p'-diphenyl diisocyanate and tetramethylene diisocyanate. The most suitable diisocyanates have molecular weights below 500.

The chain extender is preferably a low molecular weight glycol. A particularly preferred chain extender is tetra-methylene glycol. Others are ethylene glycol, diethylene glycol, hexamethylene glycol or octamethylene glycol. Both hydroxyl groups of the glycol are preferably primary hydroxyls, and the glycol is preferably unbranched (having no branches such as dependent methyl or ethyl groups).

In the preferred class of polyester polyurethanes made with diphenylmethane-p,p'-diisocyanate, those having nitrogen contents in the range of 4 to 5 percent, most preferably in the neighborhood of 4½ percent, (e.g., 4.4–4.6 percent have been found to be particularly suitable.

A particularly suitable polyurethane is made from a polyester prepolymer of at least 1,500 molecular weight, the proportions of aromatic diisocyanate, polyester and chain extender being such that the high molecular weight polyurethane is insoluble in 10 percent concentration in tetrahydrofuran at room temperature.

In preparing the polyurethane it is preferred to use a multistage reaction method in which the proportion of the reactants supplied to the earlier stage, i.e., to the reaction of the hydroxyl-terminated linear prepolymer, diisocyanate and diol chain extender, are such that there is a small stoichiometric excess of isocyanate groups (an excess of less than 20 mol percent, e.g., 5 to 15 mol percent) and the reaction is continued, in the solvent, until the isocyanate content reaches a constant level, as shown by analysis of a sample of the reaction mixture, (for instance by titration with a 0.01N solution of n-dibutylamine in dry tetrahydrofuran). At this time there are substantially no unreacted hydroxyl groups in the reaction mixture. Then, in the later stage, an amount of diol chain extender sufficient to provide one alcoholic hydroxyl group for each unreacted isocyanate group, as determined by that analysis, is added; the ensuing reaction of the isocyanate and hydroxyl groups is continued at controlled temperature and the viscosity of the mixture is measured during this reaction until a viscosity corresponding to an intrinsic viscosity in the range of about 0.9 or 0.95 to 1.4 is reached. At this time an end-capping reagent, such as an alcohol (e.g., methanol or butanediol) or other chain-terminating reactant is added to stop the reaction.

The amount of diol chain extender supplied to the later stage is below 20 mol percent (e.g., in the range of about 5 to 15 mol percent) of the amount of chain extender present in the earlier stage.

As disclosed in said application Ser. No. 819,337, the preferred solutions of polyurethane have a viscosity at least 400 poises, such as 2,000–3,500 poises. These viscosities are of course measured on the polymer solution as such (i.e., in the absence of added silica as described herein).

The stabilized polyurethanes in accordance with this invention are especially useful for the production of shoe upper material whose base is a microporous sheet consisting essentially of elastomeric polyurethane material. Unlike conventional leather substitutes which have ultimate elongations of some 20–40 percent, these sheets do not have their extensibility constrained by the presence of a reinforcing fabric (such as a woven or non-woven fibrous fabric) and can be stretched well over 50 percent (e.g., well over 100 percent and usually well over 200 percent). In a preferred form of the invention the solution of the high molecular weight elastomeric polyurethane is mixed with finely divided pore-forming microscopic particulate material (preferably microscopic sodium chloride particles) the mixture is shaped into sheet form and treated so as to add water to the shaped mixture so as to coagulate the polyurethane (which although soluble in DMF is insoluble in a DMF-water mixture containing some 12 percent water). The coagulated sheet is then treated to remove al the pore-forming particles, e.g., by leaching with hot water, to dissolve out all the salt.

For use as shoe upper material, the cast thickness is preferable such that after coagulation, leaching and drying the resulting microporous sheet is about 0.6 to 2 mm thick.

For use in making shoe upper materials the preferred polyurethanes have melting points of at least 100°C preferably above 150°C (e.g., about 170° to 200°C, as measured by differential thermal analysis or differential scanning calorimetry). When formed into a smooth void-free thin film 0.2–0.4 mm in thickness they have the properties described below: a tensile strength of at least 210 kilograms per square centimeter (preferably at least 350, e.g., about 420 to 560), a percent elongation at break of at least 300 percent (preferably at least 400 percent, e.g., about 500 to 700 percent), an elastic modulus of at least 105 kilograms per square centimeter (preferably at least 350, e.g., about 560 to 770), a 100 percent secant modulus (stress divided by strain at 100 percent elongation) of at least 28 kilograms per square centimeter (preferably at least 84, e.g., about 110 to 134). These mechanical properties are measured by ASTM D882–67.

While the mechanism by which the acidic silica aids in the stabilization of the polyurethane is not clearly understood, it is believed that the acidity of the silica serves to lower the pH of the hydrolytic environment, as by counteracting the effect of alkaline materials that may be present, or may be formed, in the aqueous medium with which the polyurethane comes in contact during the production of the microporous material (e.g., during the steps of coagulating the layer of polyurethane with aqueous medium and leaching the dispersed salt therefrom) or during use (e.g., when perspiration from the foot of the user penetrates into the polyurethane layer). The acidity of the preferred silica materials is extractable by leaching; thus, after an extended Soxhlet extraction of the Aerosil R972 material with water the pH of the silica, initially acidic, became alkaline (e.g., pH 7.7). Also, it is believed that mineral acid carried by the silica may interact with the carbodiimide stabilizer which is preferably present, as by catalyzing the reaction of the carbodiimide with water, or with any carboxylic acid end groups, thereby increasing the stabilizing activity of the carbodiimide. The invention, in its broader scope, accordingly encompasses the use, in place of the silica, of other substantially colorless inert water-resistant fillers that are of microscopic particle size and that carry water-extractable mineral acid material preferably in amount such that the pH of the filler is in the range of about 2 to 5.

It is also within the broader scope of the invention to employ the acidic particles in only part of the microporous sheet material, relying on their protective effect on the remainder, which is free of the acidic particles or has a lower concentration thereof. Thus the acidic silica may be present in one or more relatively thin microporous polyurethane layers at or near one or both surfaces of the sheet, while the rest of the thickness of the sheet is microporous polyurethane containing less, or no, acidic silica.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. An elastomeric thermoplastic polyester polyurethane containing a carbodiimide stabilizer against hydrolysis of the polyurethane and further stabilized against hydrolysis by the presence of microscopic particles of acidic silica in amount which is sufficient to increase the hydrolytic stability beyond that imparted by said carbodiimide and is above 0.1 percent and up to 8 percent, based on the weight of the polyurethane, said silica having a pH in the range of about 2 to 5.

2. A stabilized polyurethane as in claim 1 containing a polycarbodiimide having a molecular weight of at least 500 and having more than three carbodiimide groups.

3. A stabilized polyurethane as in claim 2 in which the proportion of carbodiimide is in the range of about 0.5–5 percent, and the proportion of silica is about 1 to 5 percent, based on the weight of polyurethane.

4. A stabilized polyurethane as in claim 1, said polyurethane being a thermoplastic polyester polyurethane having an intrinsic viscosity above 0.8.

5. A stabilized polyurethane as in claim 1, in which said polyurethane is in the form of a microporous layer.

6. A stabilized polyurethane as in claim 5, in which said polyurethane is in the form of a microporous self-supporting sheet consisting essentially of said stabilized polyurethane, said sheet being about 0.6 to 2 mm thick and being suitable for use as a shoe upper.

7. A stabilized polyurethane as in claim 6, said polyurethane being a thermoplastic polyester polyurethane having an intrinsic viscosity above 0.8.

8. A stabilized polyurethane as in claim 7, in which said polyurethane is a thermoplastic reaction product of a linear polyester having, in its polymer chain, carboxylic ester groups separated by aliphatic hydrocarbon chains averaging about three to six carbon atoms in length, with a diisocyanate and a difunctional isocyanate-reactive chain extender, said polyurethane being soluble in dimethyl formamide.

9. In the process for the production of microporous self-supporting shoe upper sheet material about 0.6 to 2 mm thick of thermoplastic elastomeric polyester polyurethane by mixing a solution of said polyurethane in dimethylformamide with microscopic water-soluble salt particles thereby producing a paste, forming a layer of said paste, coagulating said layer by the action of aqueous coagulant and extracting said salt particles with water, the improvement which comprises incorporating about 1 to 6 percent, based on the weight of the polymer, of microscopic particles of acidic silica having a pH of about 2 to 5 into said paste to increase the resistance of said sheet material to hydrolysis.

10. A mixture of the composition of claim 1 and dimethylformamide, the polyurethane of said composition being thermoplastic, having an intrinsic viscosity above 0.8 and being present in solution in said dimethylformamide and in concentration in the range of about 20 to 40 percent of the combined weight of the polymer and the solvent.

11. A composition as in claim 1 in which the acidic silica is a fumed silica which is hydrophobic due to the presence of a silicone at the surface of the silica particles.

12. A composition as in claim 11 containing triisopropylbenzene polycarbodiimide in amount in the range of about 0.5–5 percent and N-(trichloromethylthio)phthalimide.

13. Process as in claim 9 in which said solution of said polyurethane has a viscosity of at least 400 poises in the absence of said silica.

14. Process as in claim 13 including the step of mixing said silica and said salt particles with said solution.

15. A mixture as in claim 10 in which said polyurethane solution has a viscosity, in the absence of said stabilizers, of over 400 poises.

16. A mixture as in claim 10 in which said viscosity is 2000 to 3500 poises.

17. A mixture as in claim 10 which contains microscopic water-soluble salt particles in amount sufficient to form a paste with said solution, said mixture being adapted to formed into a microporous sheet material by forming said paste into a layer, coagulating said paste with aqueous coagulant and extracting said salt particles with water.

* * * * *